Patented July 20, 1954

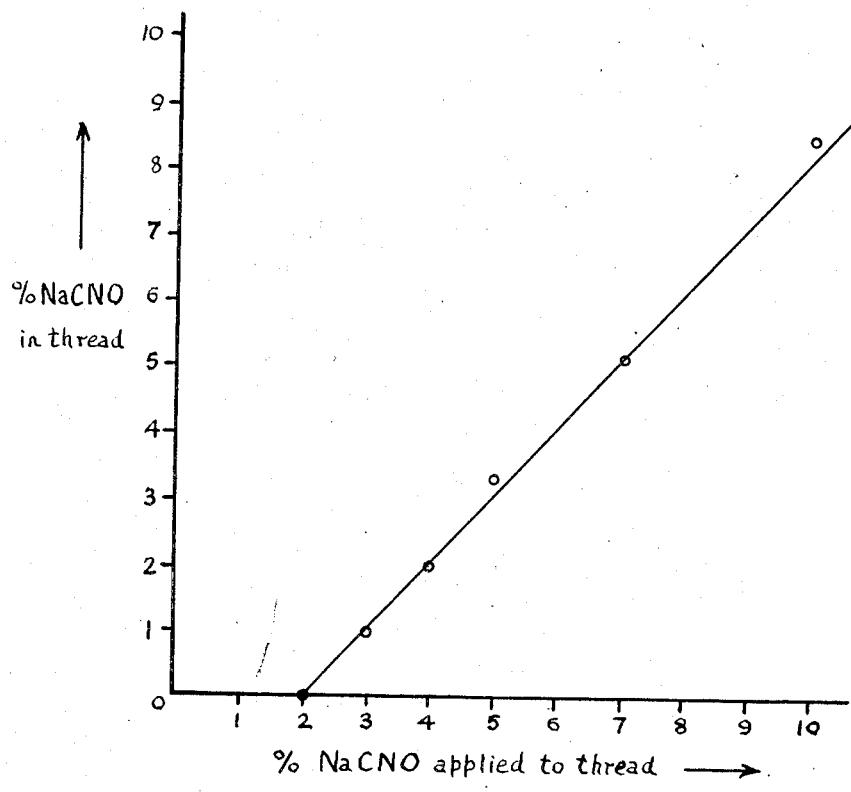

2,684,282

UNITED STATES PATENT OFFICE 2,684,282

TREATMENT OF ARTIFICIAL PROTEIN THREADS WITH CYANIC IONS

Robert L. Wormell, Coventry, and Emlyn Williams, Kenilworth, England, assignors to Courtaulds Limited, London, England, a British company Application November 13, 1951, Serial No. 255,912

Claims priority, application Great Britain December 13, 1950

3 Claims. (Cl. 18—54)

This invention relates to the manufacture and production of artificial filaments, threads, bands and the like, hereinafter referred to as threads, from casein of animal or vegetable origin and other protein compounds having similar properties.

British patent specification No. 614,506 describes a process for the manufacture and production of artificial threads from protein comprising extrusion of a solution of the protein into a setting medium followed by a hardening treatment to render the threads resistant to cold water wherein the protein is stabilised against the action of hot water and hot dilute acids either by incorporation in the spinning solution of an ionogenic compound giving rise to cyanic (CNO)$^-$-ions or by treatment subsequent to the hardening of the threads, in a bath containing an ionogenic compound giving rise to cyanic (CNO)$^-$-ions. In carrying out the process as described in the said specification No. 614,506 on prehardened threads, the threads are immersed in an aqueous bath containing for example from 4 to 10 per cent of the ionogenic compound and, after squeezing out or otherwise removing excess liquor, the threads are heated, washed and dried.

The object of the present invention is to reduce the number of processing steps in the stabilising process.

According to the present invention, a process for the production of artificial threads from protein comprises extruding a solution of the protein into a setting medium, subjecting the freshly-extruded thread to a hardening treatment to render it resistant to cold water and stabilising the hardened thread against the action of hot water and hot dilute acid by applying uniformly to the thread an aqueous solution containing an ionogenic compound giving rise to cyanic ions and removing excess solution, keeping on the thread after said removal step that amount and substantially only that amount of cyanic ions which is the chemical equivalent of the acidic amino acid residues of the protein and then drying the thus-treated thread at elevated temperature preferably between 50° and 90° centigrade.

The general formula for a protein polypeptide chain may be written as

—R—CO—NH—R'—CO—NH—
　　　R"—CO—NH—R'"—CO—NH—

The groups R, R', R", R'", are referred to as "amino acid residues." See Lewis, Squires, and Broughton, Industrial Chemistry of Colloidal and Amorphous Materials, page 162 (Macmillan, New York, 1944).

The term "acidic amino acid residues" is used herein to mean amino acid residues which are acidic in nature.

The application of the solution of the ionogenic compound to the thread is preferably effected by immersing the thread in a solution containing a cyanate and then removing surplus liquor by squeezing, centrifuging or other suitable method.

The actual amount of ionogenic compound required to neutralise the acidic amino acid residues of the protein varies slightly, depending for example on the type of protein used and the imbibition of the thread, but with the usual type of fibre-forming proteins the figure will be of the order of 2 per cent when using sodium cyanate. The equivalent amount of ionogenic compound for any particular type of thread may be determined experimentally by applying various amounts of ionogenic compound to a number of samples of the thread, heating the treated threads to dry them and determining by standard analytical methods the amount of cyanate still retained by the fibre. This experimental procedure is illustrated by the following example using stretched lactic casein threads which had been hardened by treatment for 2 hours in a bath at 55° centigrade containing in each litre, 10 grams of formaldehyde, 380 grams of sodium sulphate and 40 grams of crystalline aluminium sulphate, followed by treatment for 2 hours in a bath at 40° centigrade containing in each litre, 10 grams of formaldehyde, 300 grams of sodium sulphate, 400 grams of sulphuric acid and 40 grams of crystalline aluminium sulphate. The threads were washed free of acid and pressed.

One sample of the thread obtained was then immersed for 20 minutes in each of a number of baths containing 1, 2, 3, 4, 5, 7 and 10 per cent respectively of sodium cyanate; the threads were then squeezed to approximately 100 per cent expression, bearing in mind that the higher concentrations of salt give a higher pH so that the imbibitions are proportionally higher and were finally dried by heating for 3 hours at 70° centigrade. The amounts of cyanate on the dried threads were then determined and the results are shown graphically in the accompanying drawing. The graph shows the relationship between the percentage of sodium cyanate applied to the yarn and the percentage of cyanate retained on the dried yarn. The graph shows that the relationship is substantially linear with the equivalent quantity of sodium cyanate at approximately 2 per cent. For this particular thread therefore, the amount of sodium cyanate applied to the thread should not substantially exceed 2 per cent. If other cyanates are used, the corresponding chemical equavalent quantity should be used.

It is believed that the cyanate compound applied to the thread reacts during the drying with the acidic amino acid residues which are always present in the thread in excess over the equivalent basic residues; it is believed that cyanic acid is first liberated and that this either reacts with adjacent amino hydrogen atoms to give a stabilised link or is decomposed to ammonia and carbon dioxide thus

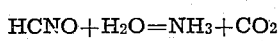

$$HCNO + H_2O = NH_3 + CO_2$$

If the ionogenic compound is present on the thread in an amount in excess of that required to neutralise the acidic groups, the excess salt becomes concentrated on the individual fibres on drying and is left as an objectionable residue in the pores of the thread.

The aqueous bath containing an ionogenic compound may also contain a soft finishing agent to improve the handle of the thread; alternatively or additionally a bactericide such as cadmium chloride may be added to the bath to render the threads resistant to bacterial putrefaction.

The present invention is illustrated by the following examples:

*Example 1*

Stretched lactic casein threads were hardened for three hours in an aqueous bath at 55° centigrade containing, in each litre, 380 grams of sodium sulphate, 10 grams of formaldehyde and 40 grams of sulphuric acid. The threads were then washed in water and immersed for 20 minutes in a bath at 20° centigrade containing, in each litre, 20 grams of sodium cyanate and 1 gram of a soft finishing agent. The threads were then centrifuged to remove excess liquor and dried in a humid atmosphere for 3 hours at 70° centigrade.

The threads obtained were stable to hot acid dyebaths.

If desired the cyanate bath may contain a bactericide, for example about 5 grams per litre of cadmium chloride.

*Example 2*

Stretched lactic casein threads were hardened for 2 hours in a bath at 55° centigrade containing, in each litre, 10 grams of formaldehyde, 380 grams of sodium sulphate, 40 grams of crystalline aluminium sulphate, the pH value of the bath being 4.0, followed by further treatment for 2 hours in a bath at 40° centigrade containing, in each litre, 10 grams of formaldehyde, 300 grams of sodium sulphate, 400 grams of sulphuric acid and 40 grams of crystalline aluminium sulphate. The thread was then cut to $1\frac{7}{16}$ inch staple lengths, and the fibres were washed free of the acid, pressed and soaked for 20 minutes in a bath at 20° centigrade containing, in each litre, 20 grams of sodium cyanate. The fibres were then hydroextracted and dried for 3 hours at 70° centigrade.

The fibres were opened on a Crighton opener, scutched and carded on the cotton system without difficulty.

*Example 3*

Stretched lactic casein thread was hardened for 3 hours in a bath at 50° centigrade containing, in each litre, 250 grams of sodium sulphate, 250 grams of crystalline aluminium sulphate and 10 grams of formaldehyde, the pH value of the bath being adjusted to 3.5 by the addition of sodium carbonate. The thread was then washed and esterified for 2 hours in a bath at 50° centigrade containing, in each litre, 180 grams of sulphuric acid and 770 grams of methyl alcohol as described in the specification of Wormell Application, Serial No. 220,727 filed April 12, 1951. The thread was then washed free from acid and methyl alcohol and rehardened for 2 hours in the same hardening bath, and washed free from salt. The thread was then impregnated by immersion for 20 minutes in an aqueous bath at 20° centigrade containing, in each litre, 30 grams of sodium cyanate and one gram of a soft finishing agent. The thread was hydroextracted and dried for 3 hours at 70° centigrade.

The threads, in addition to showing an increased affinity for easy levelling dyes, were resistant and fast to washing in soap solutions. The threads also showed no tendency to placticity even after dyeing for 4 hours at 100° centigrade.

The esterification treatment given to the hardened thread as described in the above example has the effect of increasing the number of acidic amino acid residues in the thread with the result that the thread after rehardened can tolerate up to about 3 per cent of sodium cyanate.

*Example 4*

Stretched threads prepared from peanut protein extracted according to the process described in the specification of the Farrant, Knight and Wormell Application, Serial No. 93,848 filed April 17, 1949, and now abandoned which corresponds to British patent specification No. 653,188, were hardened for 6 hours in a bath at 20° centigrade containing, in each litre, 606 grams of crystalline aluminium sulphate, 40 grams of formaldehyde and 131 grams of sodium carbonate followed by treatment for 24 hours at 25° centigrade in a bath containing, in each litre, 360 grams of sodium sulphate, 220 grams of sulphuric acid and 59 grams of formaldehyde. The threads were washed in water and soaked for 20 minutes in a bath at 20° centigrade containing 20 grams of sodium cyanate in each litre. The threads were hydroextracted and dried for 3 hours at 70° centigrade.

The threads were resistant to boiling acid solutions.

What we claim is:

1. In a process for the production of artificial protein threads comprising extruding a solution of a protein selected from the group consisting of lactic casein and peanut protein into an aqueous acid coagulating bath and subjecting the resultant freshly-extruded thread to a hardening treatment to increase resistance to cold water in a bath containing formaldehyde and at least one metal salt from the group consisting of aluminum sulphate and sodium sulphate to render it resistant to cold water, the method for stabilizing the thread against the action of hot water and hot dilute acids which consists essentially in the steps of treating the hardened thread with an aqueous solution containing cyanic ions, and removing excess solution, keeping on the hardened thread after said removal step, that amount and substantially only that amount of cyanic ions which is the chemical equivalent of the acidic amino acid residues of the protein; and drying the thus-treated thread at an elevated temperature.

2. The process claimed in claim 1 wherein the thread is dried at a temperature between 50° and 90° centigrade.

3. The process claimed in claim 1 wherein the aqueous solution containing cyanic ions is a solution of sodium cyanate.

References Cited in the file of this patent

FOREIGN PATENTS

| Number | Country | Date |
|---|---|---|
| 614,506 | Great Britain | Dec. 16, 1948 |